(12) United States Patent
Williams et al.

(10) Patent No.: US 6,763,157 B1
(45) Date of Patent: Jul. 13, 2004

(54) SELF ALIGNING OPTICAL INTERCONNECT WITH MULTIPLE OPTO-ELECTRONIC DEVICES PER FIBER CHANNEL

(75) Inventors: Richard J. Williams, Hollis, NH (US); Mani Sundaram, Nashua, NH (US)

(73) Assignee: Teraconnect, Inc., Nashua, NH (US)

( * ) Notice: Subject to any disclaimer, the term of this patent is extended or adjusted under 35 U.S.C. 154(b) by 56 days.

(21) Appl. No.: 10/162,729

(22) Filed: Jun. 4, 2002

Related U.S. Application Data

(63) Continuation-in-part of application No. 09/851,714, filed on May 9, 2001, now Pat. No. 6,398,425.
(60) Provisional application No. 60/202,800, filed on May 9, 2000, and provisional application No. 60/202,600, filed on May 9, 2000.

(51) Int. Cl.[7] ................................................. G02B 6/42
(52) U.S. Cl. ............................ 385/15; 385/89; 385/24; 385/88; 398/150
(58) Field of Search ............................. 385/15, 89, 24, 385/88, 90, 129–132, 147; 398/145, 150, 164

(56) References Cited

U.S. PATENT DOCUMENTS

| | | | |
|---|---|---|---|
| 5,359,447 A | 10/1994 | Hahn et al. | |
| 5,631,988 A | 5/1997 | Swirhun et al. | |
| 5,696,862 A | 12/1997 | Hauer et al. | |
| 5,858,814 A | 1/1999 | Goossen et al. | |
| 5,858,841 A | 1/1999 | Hsu | |
| 5,912,913 A | 6/1999 | Kondow et al. | |
| 5,978,401 A | 11/1999 | Morgan | |
| 6,398,425 B2 * | 6/2002 | Williams et al. | 385/89 |

OTHER PUBLICATIONS

PCT International Search Report dated Oct. 30, 2001 of International Application No. PCT/US01/14957 filed May 9, 2001.

Krishnamoorthy, Ashok V., Firehose Architectures for Free–Space Optically–Interconnected VLSI Circuits, Special Issue on Parallel Computing with Optical Interconnects, Journal of Parallel and Distributed Computing, Nov. 1996, pp. 1–10 complete article also see marked up cover and p. 6 included.

Travers, Christine M. et al., VLSI Photonic Smart Pixel Array for I/O System Architectures, pub Jan. 1998, This is best copy found.

Kitayama, Ken–Ichi et al, Two Dimensional Parallel Optical Data Link: Experiment* IEEE, 1996 pp. 206–214.

Neff, John A. et al. VCSEL/CMOS Smart Pixel Arrays for Free Space Optical Interconnects, IEEE 1996 pp. 282–289.

Kosaka, Hideo et al., Plastic–Based Receptacle–Type VCSEL–Array Modules with One and Two Dimensions Fabricated Using the Self Allignment Mounting Technique, IEEE 1987 or 1997 pp. 382–385 This is best copy found.

No Author,—Smart Pixel Array (SPA) for VLSI–Photonics, DARPA website, this is the best copy found.

* cited by examiner

Primary Examiner—Phan T. H. Palmer
(74) Attorney, Agent, or Firm—Maine & Asmus

(57) ABSTRACT

A system to facilitate alignment of an optical connector to respective optical channels of one or more optical arrays. Optical planar arrays having multiple optical emitters and multiple optical detectors of a multi-channel optical link are aligned by employing supporting circuitry and software that controls the optical devices, enabling all receivers, turning on the transmitters sequentially, and recording the optimal transmitter/receiver pairs. Another feature of the invention is the aspect of redundancy, wherein the system establishes a record of spare emitters and spare detectors that are used when the selected transmitter receiver pair degrades or fails. The techniques of the present invention also provide a unique multiplexer/demultiplexer arrangement for a single wavelength channel of emitters and detectors.

20 Claims, 2 Drawing Sheets

SELF ALIGNING OPTICAL INTERCONNECT WITH MULTIPLE OPTO-ELECTRONIC DEVICES PER FIBER CHANNEL

CROSS REFERENCE TO RELATED APPLICATIONS

This application is a Continuation-in-Part to pending U.S. application Ser. No. 09/851,714, filed May 9,2001, now U.S. Pat. No. 6,398,425 which further claims priority for all purposes to U.S. provisional patent applications Ser. Nos. 60/202,800, and 60/202,600, both filed May 9, 2000.

BACKGROUND OF THE INVENTION

1. Technical Field of the Invention

This invention most generally relates to the alignment of planar arrays of electro-optical devices with optical link connectors used for multi-channel optical data communications; and more particularly to a method for mapping the results of the physical alignment of an optical array to a multi-channel optical link connector where multiple electro-optical devices are available for each optical channel to optimize an emitter/detector pair and provide redundancy.

2. Background Art

Integrated circuit technology allows large numbers of VCSEL (Vertical Cavity Surface Emitting Laser) laser emitter optical transmitters and p-i-n diode photo detector optical receivers to be constructed as large, two dimensional planar arrays, with one or more such arrays mounted on a common ASIC (Application Specific Integrated Circuit) substrate, as by flip-chip methods, also known as hybridization mounting techniques, each emitter and/or detector of the array making electrical connections with circuitry previously constructed in the ASIC substrate. This compound device, when coupled with precision alignment to a terminal end or node of a multi-channel optical link such as the end of a fiber optic bundle, provides an electro/optical communications interface where an electronic signal is converted by a VCSEL to an optical signal, directed at a end face of a single channel optical core of a terminator/connector, and hence along an optical transmission path fiber within the bundle, to be discharged via a carefully aligned receiving end fiber terminator/connector into a photo diode opto-electronic receiver on the same or another optical array of the same or another ASIC substrate, and converted by that photo detector back into an electronic signal. Fiberoptic communications channels provide significantly greater speed and effective bandwidth capabilities as compared to electrically conductive leads.

Each core end of the optical fiber bundle terminator or connector must be carefully aligned with its VCSEL on one end and corresponding detector on the end in order for the optical communications channel to be effective. Light pipes and image guides are commonly used to terminate a fiber bundle and connect the individual light fibers to their respective optical elements in planar photo arrays. These must be carefully aligned without actual contact and mechanically fastened to the planar array or its ASIC substrate so as to maintain optical alignment. Sufficient misalignment between the optical face of the array and the terminator face, in any of the Z-axis parameters of lateral offset, rotation, tilt, and spacing as between a multi-channel fiber terminator and a photo optic array, can cause a significant number of optical channels to be unusable.

As the density of the arrays of emitters and detectors increases, coupling a multi-channel fiber optic cable, image guide, or other optical connector or terminating device to the transceiver array becomes an increasingly more arduous task. Lateral offset and rotation alignment are particularly burdensome, while spacing and tilt alignment are more easily controlled with proper mechanical connectors and spacing structures.

What is needed is a device and system for self alignment of emitters and detectors that can determine the optimal emitter/detector pair as well as establish spare detectors and emitters that can be used when the primary emitter/detector pair degrades in performance. Such an invention should allow multiplexing of emitters operating at a single wavelength to be transmitted in a single fiber and be demultiplexed at the other end by the detectors. There can be a memory section that stores the insertion loss values of the mapping process to enable redundant emitters and detectors to quickly switch over form faulty emitters or detectors.

SUMMARY OF THE INVENTION

The invention is devised in the light of the problems of the prior art described herein. Accordingly it is a general object of the present invention to provide a novel and useful apparatus and technique that can solve the problems described herein.

It is an objective of the invention to provide a method for determining the alignment of a multi-channel optical link connector to a planar optical array.

It is another objective of the invention to provide a method for determining the alignment of each of the channels of a multi-channel optical link connector to the optical devices on a planar optical array.

It is a further objective to provide a method for determining the alignment of both ends of each of the channels of a multi-channel optical link to the optical devices of respective planar optical arrays.

An object of the invention is a self-aligning apparatus for electro-optical devices and optical connectors, comprising at least one planar array containing a plurality of optical detectors and a plurality of optical emitters with respective drive circuitry for said emitters and said detectors. There is at least one optical link connecting the emitters and the detectors of the planar array, wherein the optical link establishes an illumination area within the plurality of detectors. A processing section is coupled to the detectors and coupled to the emitters, wherein the processing section controls light signals from the emitters to the illumination area and wherein the processing section performs selective measurements of the light signals with the detectors, and wherein the processing section selects a primary emmiter/detector pair based on the measurements.

Another object is the self-aligning apparatus, wherein based on the measurements the plurality of optical detectors comprise one or more spare detectors that are switchably connectable, or one or more spare emitters that are switchably connectable.

An additional object is the self-aligning apparatus, further comprising a monitoring section coupled to the primary emitter/detector pair to monitor performance of the primary emmitter/detector pair. Based on said measurements, one or more spare emitter/detector pairs can be substituted for the primary emitter/detector pair.

And a further object is the self-aligning apparatus, wherein the optical links are optical couplers selected from the group comprising ordered fiber bundle, image guide, waveguide, pigtail and microlenses. In addition, the optical links can be transmissive mediums selected from the group comprising free space optics and guided wave optics.

In one embodiment of the self-aligning apparatus, the processing section cycles through the detectors one at a time with one or more emitters active to precisely locate the illumination area. The cycling establishes a mapping of the measured values. Therefore, the device can include a memory section, wherein a table of insertion loss values from the selective measurements are stored in the memory section.

An additional object is the self-aligning apparatus, wherein the emitters and the detectors are located on separate planar arrays. The emitters can be located on different planar arrays and can even be separated from each other, as the present system performs a multiplexing/demultiplexing function.

Yet a further object is the self-aligning apparatus, wherein the emitters function as detectors by changing a voltage polarity of the emitters.

It should be apparent to those skilled in the art that the optical detector is a device that converts energy of incident radiation into electrical energy. There are various types of such devices and the present invention is not limited to a specific device. Likewise, the emitter is a device that emits radiation when electrical energy is applied, and is not specific to any one device.

An optical communications device with built-in redundancy, comprising at least one array containing a plurality of optical detectors and at least one array containing a plurality of optical emitters with respective drive circuitry for the emitters and detectors, wherein a group of emitters form an emitter channel and a group of detectors form a detector channel and the group of said emitters and the group of detectors operate at a single wavelength. There is at least one emitter multiplexer coupled to the emitter channel, and at least one detector demultiplexer coupled to the detector channel. There are one or more optical links connecting from the emitter multiplexer to the detector demultiplexer. A processing section is coupled to the detectors and coupled to the emitters, wherein the processing section controls light signals from each of the emitters of the emitter channel to each of the detectors in the detector channel and wherein the processing section performs selective measurements to establish a redundancy hierarchy. The redundant hierarchy can be a table of emitter and detector pairs based on criteria such as insertion loss.

In contrast to the many applications attempting to utilize different wavelengths, the present invention has found that using a single wavelength as described herein provides some significant benefits to the present device.

A further object includes the multiplexing/demultiplexing device, wherein the plurality of optical detectors comprise redundant detectors and emitters that are switchably connectable.

And another object is the multiplexing/demultiplexing device, wherein the optical links are selected from the group comprising ordered fiber bundle, image guide, waveguide, pigtail, and microlenses. The light from disparate emitters can be muxed onto a single optical fiber and demultiplexed by the detectors utilizing the teachings of the present invention.

An additional object is the multiplexing/demultiplexing device, wherein the processing section cycles through the detectors one at a time for a single emitter to establish the channel. Alternatively, all the emitters can be cycled for an individual detector.

For proper performance of electro-optical planar array devices used to provide data communications over optical links, it is essential that there is sufficient control over the alignment of the optical array face with respect to the optical link connector to assure an effective optical communications channel is present between identifiable sets of emitters and detectors. This invention desensitizes the precision required of the physical alignment of a multi-channel fiber optic link connector to the optical planar array face as compared to the one to one correspondence between an optical fiber termination and an optical device as used in the prior art.

The invention depends on using undersampling techniques that assume each fiber will be optically connected to several emitters on one end and/or several detectors on the other end, in combination with an automated mapping of the physical alignment of a non-precision connection which sorts out the available channels of the optical link and the emitter sets and detector sets common to each channel. This self-determination methodology of alignment provides data that then permits selection and de-selection from among the individual emitters and detectors on each array in accordance with various schemes for optimizing the performance of each channel of the communications link.

VCSELs can be produced in planar arrays by several methods. Ion-implanted VCSELs can be made with a diameter ranging from 20 to 100 microns. Oxide VCSELs can range from 20 to 60 microns. Etched-post VSCEL arrays are now feasible with VCSEL diameters of 5 to 40 microns; and with a 2 micron wide trench, can have a pitch as small as about 7 microns. This provides the potential for a significant planar face density of optical devices per fiber channel, using, for example, 50 or 62.5 micron diameter fiber cores terminated in a suitable connector.

There are several intuitive methods for aligning an optical fiber array to its respective electro-optical array to achieve accurate device-to-channel alignment according to the present invention. The fabricator may simply observe the electro-optical devices through a part of the connector and visually or "passively" align target reference points of the components, perhaps with the aid of a transparent fiber alignment faceplate or template. Another method is to interconnect all of the various electrical and optical assemblies and perform "active" final physical alignment of the multi-channel fiber connector to the optical array so as to optimize the multi-channel connection as seen at the detector side of the optical link, and then secure the connector to the optical array or its ASIC substrate in that precise position. In either event, each such connection requires a closely controlled, precise step in the assembly process that contributes to the time and cost to assemble devices employing this technology.

Summarizing one technique of the invention for the simpler case, during the self-alignment of an under-sampled transmitter array to the fiber bundle, the transmitters devices are activated, for example in a rastering mode, while the detector array receiving the time-related impulses, and its controlling software embedded in the underlying ASIC or in the ASIC in combination with remote circuitry and software, map the unique set of adjacent transmitters producing a respond in each detector. If the detector array is connected on a one to one basis with the fibers or optical channels of the optical link, then the emitter set for that channel has been identified, in effect establishing the result of the physical alignment and mounting of the fiber optic connector to the transmitter array.

The use of multiple emitters per channel, along with the self-determined alignment information, provides further opportunities for individual selection, de-selection and control of the emitters within the set to optimize the use of each channel. As will be readily apparent to those skilled in the art, the corresponding methodology and the further opportunity for the case of an under-sampled receiver array is quite similar, except that detector sets for each emitter channel are identified, and subsequent control of detectors can be exercised for optimizing channel performance.

In the simplest case, for determining which detectors have been excluded from all possible channels by the particular physical connection of a multi-channel optical link to a detector array, as made during fabrication, the all-channels to all detectors alignment can be accomplished by simply illuminating the other, input end of the optical link with an expanded beam of suitable wavelength so that detectors adequately coupled to any channel that will respond and be recognized.

A logical further scenario is where there are multiple optical devices at each end of each fiber channel. They may, of course, be on the same optical chip, on different optical chips on the same ASIC substrate, or on optical chips on different ASIC substrates. The invention also extends to chips of any sort that may integrate the ASIC and electro-optical surface arrays for both intra-chip and inter-chip optical communication, where assembly requires physical alignment of a multi-channel optical link connector to at least one planar array of optical devices on the chip, or as in this case, with both ends of the multi-channel link connected each to a planar array of optical devices.

In this case, the automatic self-determination alignment methodology of the invention requires the following steps:

1. Interconnect two planar arrays of very small electro-optical devices of photo-emmitters and detectors with a multi-channel fiberoptic bundle, or optical link, where each end of the bundle is terminated by a suitable connector, each of which is attached to one of the arrays, so that each fiber of the bundle is linked to or "sees" at one end several electro-optical emitters on one array and is linked to or "sees" at its other end several electro-optical detectors on the other array. The interconnect step in this case is a relatively non-precise physical operation with respect to lateral offset and rotation, but is still sufficiently precise to assure proper Z-axis spacing and tilt tolerances of the optical link connectors to the optical arrays. It does not depend on critical alignment of channels to respective optical devices, but rather on overall array to connector edge alignment, since it is not necessary to establish an exact alignment or to achieve a pre-determined optical device-to-channel alignment at this stage.

2. Enable all of the detectors on the receiver array, or on both arrays, or each array in turn if using transceiver arrays. This is done through ASIC or ASIC in combination with remote control circuitry and software.

3. Raster or otherwise sequence the individual photo emitters of the transmitter array, both transmitter and receiver arrays, or each array in turn, if using transceiver arrays. This is likewise done through ASIC or ASIC in combination with remote control circuitry and software.

4. Record the particular detectors illuminated with respect to each emitter in turn. When an emitter device of the transmitting array is on, only those detectors that are aligned with the same optical fiber serving that emitter will have useful sensitivity. Blanket illumination of the detector arrays is prevented because of the occulting portions of the optical fiber array. The effect is the same for an ordered fiber bundle or a more common over-sampling image guide. The ability to monitor and record or "map" the detector response is resident within the local ASIC, or is shared with remote control circuitry and software.

5. Establish, again through the ASIC or in combination with remote control circuitry and software, the detector sets of adjacent detectors common to each emitter as seen through the optical link.

6. Match up common sets of detectors to identify emitter sets of adjacent emitters using a common optical channel, again through the ASIC or in combination with remote control circuitry and software.

The methodology may be extended to mapping and recording the intensity or signal strength of each emitter/detector pair within a given optical channel, so that there may be a suitable initial selection from among the emitters and detectors of associated emitter and detector sets using the same channel that optimizes that channel of the communication link. The channel's emitter/detector pairs intensity map can be periodically compared to a fresh mapping of channel intensity, for possible re-selection of suitable emitters and detectors from amount those available.

A table of insertion loss measurements can be used select the optimal emitter/detector pair. The table can be stored in memory so that as the emmiter/detector pair performance drops, the next best emitter/detector pair can be selected. This built in redundancy would be invisible to the user as the switch would occur through the drive circuitry. Alternatively, the whole mapping process could be repeated to establish a new table of insertion loss values for the emitter/detector pairs. Monitoring devices are known in the art and can evaluate the performance of the emmiter/detector pair for degradation. Alternatively, a simple timing schedule can be used to switch to a fresh emitter/detector pair after a certain time interval has elapsed. In another embodiment, the device could regularly switch between various emitter/detector pairs with satisfactory performance thereby prolonging the lifespan of all the emitter/detector pairs in the channel.

A further benefit of the undersampling and mapping scheme is that spare emitters and detectors within the channel are available, should there be a failure of one of these optical devices. The methodology supports the implementation of differential optical signals in a given channel, using selective combinations of available emitters and detectors from among the emitter and detector sets of the channel.

Elaborating on the concept of having spare emitters and detectors, the present invention provides for redundancy in the event of failure of the primary emitter or detector. Emitters and detectors do have a certain life span, and the spare device can remain inactive until a complete failure or a threshold failure of the primary device and then activated to become the primary device. Alternatively, there may be advantages to cycling between the primary devices and the spare devices to extend the life span of operation. The processing section can retain a log of operating periods and increase the test cycle of those devices nearing the end of the life span or otherwise transition to the spare device at a fixed time period.

In operation, the system performs measurements as part of the alignment process and the measurements are used to also track emitter and detector performance. An emitter failure within a group of emitters would easily be detected and by the measurement values. The spare emitter could then be switched into operation in place of the malfunctioning emitter. As the drive circuitry and processing section are integrally connected with the emitters/detectors, the transfer is seamless. Testing of receivers/detectors are accomplished in a similar manner by making measurements and when the measurements are no longer correct, the spare detector can be switched into the array. Discerning between emitter and detector errors can also be quickly ascertained by switching emitters and/or detectors.

On a larger scale, the methodology of the invention provides for periodic or automatic alignment assessments of the connector to the optical planar array to guard against creeping physical re-alignment due to environmental effects such as deforming temperature, torque or pressure on the device. When necessary, the fill, self-alignment mapping procedure can be run again to reset the baseline emitter and detector sets for each channel.

It will be readily apparent that fiber channels with multiple optical devices at each end, such as where being connected to transceiver arrays with uniformly distributed emitters and detectors, may have bi-directional capability for all or some channels. The fully defined physical alignment map provides the data necessary for selection, de-selection and control of the devices at each end of the link, enabling ASIC and remote control circuitry and software to manipulate both direction and performance of each channel, within the total capability of the devices associated with that channel.

It will be further apparent to those skilled in the art that the methodology can be extended to compound optical links having more than two connectors or nodes, where transmitters from one array may be linked with and communicating to detectors of two or more other arrays, or where detectors in one array may be linked to receive data from either of two or more transmitter arrays, or as may otherwise be required in variations of simplex, duplex, star and ring interconnect topologies.

Still other objects and advantages of the present invention will become readily apparent to those skilled in this art from the following detailed description, wherein we have shown and described only a preferred embodiment of the invention, simply by way of illustration of the best mode contemplated by us on carrying out our invention.

BRIEF DESCRIPTION OF THE DRAWINGS

The present invention will be readily understood by the following detailed description in conjunction with the accompanying drawings, wherein like reference numerals designate like structural elements, and in which.

DESCRIPTION OF THE PREFERRED EMBODIMENT

The invention being susceptible of many embodiments, what follows is only a description of a preferred embodiment, and should not be construed as limiting of the invention.

Figure 1:
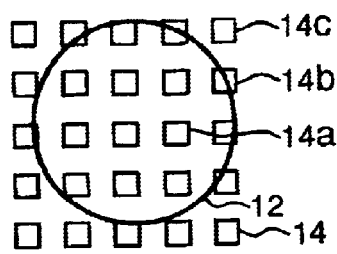
FIG. 1 illustrates a section of an optical link connector to optical array interface, the section limited to an optical fiber core end illumination cone or surface area overlaying a uniform array of optical detectors; some detectors clearly within the illumination area of the fiber core, some overlapping to some extent, and some being outside the fiber core illumination area.

Referring to FIG. 1, there is illustrated a section 10 of an optical link connector to optical array interface, the section limited to an optical fiber core end illumination cone or surface area 12 overlaying a uniform array of optical detectors 14; some detectors 14a clearly within the illumination area 12, some detectors 14b overlapping to some extent, and some detectors 14c being outside the fiber core illumination area For the purpose of this disclosure, the term "illumination area"is applicable to the cross section area of the cone of exposure on the optical planar array, of a channel end or fiber core end in an optical link terminal connector, for effectively receiving the output of optical transmitters on the optical planar array, as well as for illuminating photo detectors with optical signals from another node or end of the link.

FIG. 1 helps to explain a first preferred embodiment method for aligning a multi-channel optical light source or data communications link connector that is configured with channel terminations distributed across a planar connector face so as to provide some degree of spacing or buffer area between channel illumination cones for optical isolation between channels, to a planar optical array of photo detectors, such as an electro-optical array of p-i-n diodes that is flip-chip bonded to an ASIC substrate. The multi-channel light source or data communications link may be any sort of light source or optical data source or sources, whether individual to each channel or common to all channels; whether coming from one node or several nodes of the optical link. The method requires of the optical array of p-i-n-detectors, which may also be other present or novel types of photo detectors, that the array density of the detectors, when compared to the size of the channel illumination area, be sufficient to assure there will be a multiplicity of detectors within the illumination cone of each channel core, as is illustrated in FIG. 1. The invention further requires there to be common or coordinated control capability of the optical transmitters or light source, and the receivers, in order to conduct the embodiment described. While the method is most useful in the case of multi-channel optical link connections, it is applicable to any single or multi-channel case, where the alignment of optical devices of the planar optical array to the optical channel connector is indeterminate from the manner in which the connection was made.

As a preliminary step of this embodiment, the optical link connector is first physically mounted securely with minimal precision to the array, mainly assuring the fill face of the connector is substantially overlapping the detector array so that each channel core end 12 is exposed to a multiplicity of detectors 14, the precise alignment of individual detectors to the connector being indeterminate at this point. The connector attachment means should be sufficient to keep Z-axis spacing and tilt parameters within normally usable tolerances. The automated self-alignment procedure of this embodiment can then be initiated.

Detectors 14 are first enabled electronically by their respective supporting circuitry and control software, such as may be found in the ASIC substrate to which an electro-optical array is mounted, so as to be responsive to light signals through the optical link, if received. A light source is then remotely applied to each channel of the optical link in turn for a period of time, causing a respective area 12 illumination of a limited number of detectors 14 in a different section of the array during each period of illumination. During each sequential illumination period, detectors indicating a response, necessarily from among detectors 14a and 14b for the respective channel, are cataloged by control circuitry and software as the detector set associated with or "aligned" with that channel core termination. Obviously, any faulty detectors from among the group of 14a and 14b detectors that are not responsive will not be recorded as part of the aligned detector set.

Thus the present system also provides an automatic redundancy system. With multiple emitters and detectors within the illumination area or cone of exposure, a plurality of spares are contained within the illumination area. The spares are switchably connectable upon detection of a faulty emitter or detector. In an alternate embodiment the spares are part of the overall system and alternate with the remaining emitters and detectors to extend the life span of the regular emitters and detectors.

A pre-determined or determinable threshold of intensity of response may be used by the supporting circuitry and software to de-select marginal detectors, such as the partially overlapping detectors 14b. There may be an additional sensing by the supporting circuitry of the intensity of individual detector responses, which may likewise be recorded for further channel use management, such as selecting specific single detectors or detectors in combination for total output strength, or for repairing the channel when a detector fails, or for fan-out capability where a received signal is being divided and processed in parallel for any of various reasons.

Figure 2:
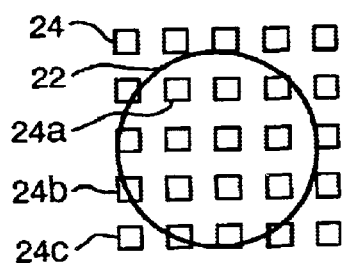
FIG. 2 illustrates a section of an optical link connector to optical array interface, the section limited to an optical fiber core end receiving cone or surface area overlaying a uniform array of VCSEL transmitters; some VCSELs clearly within the area of the fiber core, some overlapping to some extent, and some being outside the fiber core receiving area.

Referring to FIG. 2, there is illustrated a section 20 of an optical link connector to optical array interface, the section limited to an optical fiber core end receiving cone or surface area 22 overlaying a uniform array of VCSEL transmitters 24; VCSELs 24a being clearly within the area of the fiber core, VCSELs 24b overlapping area 22 to some extent, and VCSELs 24c being outside the fiber core receiving area 22.

FIG. 2 helps explain another preferred embodiment, the corollary method to the FIG. 1 embodiment, where the detectors of FIG. 1 are optical transmitters, and other aspects of the corollary explanation will be readily apparent to those skilled in the art. In summary, the connector having been physically connected in the noncritical manner described, the alignment method requires enabling a remote detection capability able to distinguish on which channel it was receiving. Then transmitters 24 are turned on sequentially, while the supporting circuitry and software records which transmitters were remotely detected, and on which channel. The several transmitters of the transmitter set associated with a particular channel are then defined as aligned. As previously described, the intensity of the received signal can likewise be measured, a threshold amount required to distinguish 24b transmitters and weak 24a transmitters from normal 24a transmitters the 24c and non-functioning transmitters having not been recorded at all.

Again, similar to the FIG. 1 embodiment, the good transmitters of the FIG. 2 embodiment are then selectable and deselectable through supporting circuitry and software for various useful purposes. Also again, this embodiment requires a common or coordinated control capability within the supporting circuitry and software of the transmitters and the remote detection means for sensing an optical output in each channel, in order to conduct the alignment procedure described.

Figure 3:
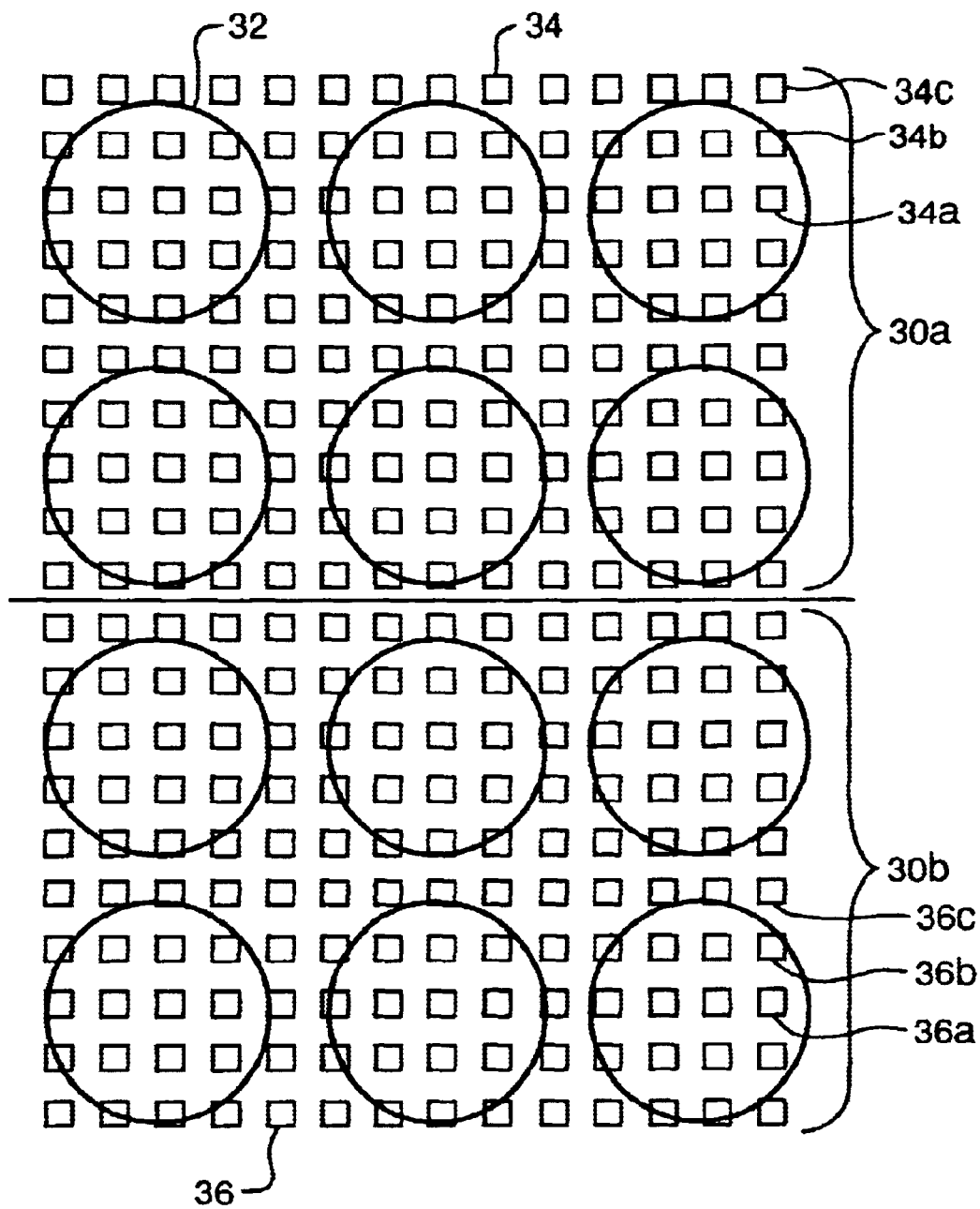
FIG. 3 illustrates a section of an optical link connector to optical array interface, the section limited to several adjacent optical fiber core end effective areas overlaying a uniform array of optical devices, where a subsection of the devices are VCSELs and the remaining subsection are p-i-n photo detectors; some devices clearly within the effective areas of their respective fiber cores, some overlapping one fiber core to some extent, and some being outside all fiber core areas.

Referring now to FIG. 3, there is illustrated a more complex embodiment of the invention, the alignment of both end connectors of an under sampled, multi-channel optical communications link between a transmitter subsection and a receiver subsection of a common chip. This embodiment is extendable to at least the cases of two different chips on the same ASIC substrate, or to two different electro-optical devices so long as there is a common or coordinated control capability for all transmitters and detectors through the supporting circuitry and software. More specifically, there is shown a section 30 of an optical link connector to optical array interface, the interface diagram showing several adjacent optical fiber core end effective areas 32 overlaying a uniform array of optical devices, where a subsection 30a of the devices are VCSELs 34 and the remaining subsection 30b are p-i-n photo detectors 36. Optical devices 34a and 36a are clearly within the effective areas of their respective fiber cores, devices 34b and 36b overlap a fiber core effective area 32 to some extent, and devices 34c and 36c are outside all fiber core areas.

Again, as in prior embodiments, the connector is physically attached with non-precession alignment, such as by 2-edge alignment as in FIG. 3, where the left side and lower edge of the core pattern and the optical device pattern coincide. However, as is readily apparent, the particular distribution of optical devices to channel cores is the result of the particular placement of this connector to this array. The range of non-precision placement of the connector to the array, as to lateral and rotational orientation, frequently results in quite different distributions from chip to the next, making any precise prediction of optical device to channel alignment, problematic at best.

The FIG. 3 embodiment method is a combination of the prior embodiment methods, requiring the steps of enabling all the subsection 30b detectors; turning on all of the transmitters in sequence; during the on period of each transmitter, scanning the detectors for response and recording the detector sets responding to each transmitter, and then matching detector sets to identify channels and transmitter sets associated with each channel so as to have a full alignment mapping of optical devices per channel. The same nuances of signal strength or intensity can be sensed and used for further logical selection and de-selection of transmitters and detectors for channel optimization and multi-node considerations, as previously described.

Figure 4:
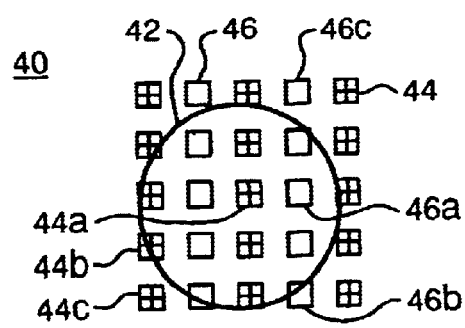
FIG. 4 illustrates a section of an optical link connector to optical array interface, the section limited to an optical fiber core end receiving cone or surface area overlaying a uniformed distributed army of VCSEL transmitters and p-i-n detector/receivers; some VCSELs and some detectors clearly within the area of the fiber core, some of each overlapping to some extent, and some of each being outside the fiber core receiving area.

Referring now to FIG. 4, there is illustrated a circumstance to which a further embodiment method is applicable, where a section 40 of an optical link connector to optical array interface, the section limited to an optical channel fiber core end illumination surface area 42 overlaying a uniformly distributed columnar array of VCSEL transmitters 44 and p-i-n detector/receivers 46. VCSELs 44a and detectors 46a are clearly within the channel core area 42, VCSELs 44b and receivers 46b are each overlapping area 42 to some extent, and VCSELs 44c and receivers 46c are outside the channel core receiving area 42. Again, there is a preliminary assumption that the connector is attached by non-precision means so that the precise alignment of optical devices to channels is uncertain. However, with alternating rows of transmitters and detectors, it will be readily apparent that there will be a multitude of each within each channel's core illumination area, providing the opportunity for bi-directional communication through each optical channel.

Assuming the other end or nodes of the optical link to be similarly configured and connected, and again assuming that there is common or shared control of the optical devices through supporting circuitry and software, the alignment methodology of the invention is conducted in the following manner. The detectors of all but a first node of the optical link are enabled. The transmitters of the first node are turned on in sequence. During the "on" period for each transmitter, the responding detectors at each node are recorded as detector sets associated with that transmitter. The detector sets are then matched to identify each channel and the transmitter set of the first node associated with that channel. The process is then repeated for each node of the optical link, until full alignment mapping of optical devices per channel is accomplished. Again, the same nuances of signal strength or intensity can be sensed and used for further logical selection and de-selection of transmitters and detectors for channel optimization, selecting direction of transmission, and multi-node considerations.

Irregular or intentional alterations in the above-described configurations may likewise be addressed by the alignment method of the invention. For example, normally the channel illumination areas as projected onto the optical array face are segregated by a zone of non-illumination that will prevent some optical devices from being useful. In the opposite case, whether calculated or unintentional, there may be overlapping channel end illumination areas where one or more optical devices may appear in the device sets of two adjacent channels. Upon completion of the alignment procedures of the invention, these optical transmitters or detectors will be readily ascertainable, and can be either de-selected, or exploited for cross-channel utilization of various sorts.

Another example of the invention includes a method for aligning the optical transmitters of an optical planar array to the channels a multi-channel optical link connector attached to the planar array, where the method includes the steps of employing a connector and optical array configuration in which a multiplicity of transmitters will be within the illumination area of each channel when connected, employing responsive means for optical detection at a remote end of each channel of the optical link, and using supporting circuitry and software that has control of the transmitters and the means for optical detection. Then enabling the means for optical detection at each said channel, turning on a first transmitter for a period of time, and during that period of time, recording which of the channels for which the means for optical detection is responding to the first transmitter, this transmitter being thereafter associated with that channel.

Then repeating the steps of turning on and recording receivers for each additional transmitter in sequence, all the transmitters associated with a common channel defining a channel-specific transmitter set, thus establishing the alignment of all useful transmitters and transmitter sets to a respective channel of the connector. An optical transmitter may be of any type that emits radiation when given the proper electrical input. It may be a VCSEL, an LED (light emitting diode), or a pn junction device, or other radiation emitter that can be fabricated in quantity as a two dimensional planar array. The optical link connector may be an end connector or a nodal termination connector for an optical data communications link.

A further example of the invention is method for aligning the optical receivers of an optical planar array to the channels of a multi-channel optical link connector attached to the a planar array, where the method includes the steps of using a connector and optical array configuration in which a multiplicity of the receivers will be within the illumination area of each channel when connected, employing a light signal source for input at a remote end of each channel of the optical link, and using supporting circuitry and software that has control of the receivers and the light signal source. Then enabling the receivers for responding to light detection, and turning on the light signal source of a first channel for a period of time. Then during that period of time, recording which of the receivers is responding to the first channel, all such receivers defining a receiver set aligned with the first channel. Then repeating the steps of tuning on and recording responses for each additional channel in sequence, thereby establishing the alignment of all useful receivers and receiver sets to respective channels of the connector. An optical receiver can be of any type that measures or converts the energy of incident radiation into a useful other energy, particularly electrical. Suitable receivers may be p-i-n diode detectors, photovoltaic or photo conductive devices or other light sensitive opto-electronic devices that can be fabricated in quantity as a two dimensional array. The optical link connector may be an end connector or a nodal termination connector for an optical data communications link.

A yet further example of the invention is a method for aligning at each connection, the channels of a multi-channel optical link to the optical devices of the respective optical planar array of the connection. The method entails employing a connector and optical array configuration at each connection in which a multiplicity of the optical devices will be within the illumination area of each channel for each said connector, and employing supporting circuitry and software that has control of all the optical devices of at least two of the connections of the optical link, where the optical devices are transmitters and receivers. Then enabling all the receivers for responding to a transmitted light signal, turning on the first transmitter of the first connection for a period of time. Then during the period of time, recording which of the receivers is responding to the first transmitter; all of the receivers responding to the first transmitter defining a receiver set which is thereafter associated with the first transmitter of the first connection. Then repeating these steps for each additional transmitter of the first connection in sequence, and comparing which receiver sets are a close match, having the same or nearly the same receivers. The associated transmitters of the matching receiver sets define an associated transmitter set with an optical channel between the transmitter set and its respective matching receiver sets Then repeating the steps for each additional connection in sequence, the result being a complete alignment mapping of the optical link and all its nodes or connections.

The optical link may be a fiber optic bundle. The multi-channel optical link may be a uni-directional or bi-directional optical data communications link with two end nodes or with multiple nodes as in a ring or star topology.

As articulated in the co-pending and related applications, the present invention can encompass other optical coupling and interfaces. There can be a faceplate or other device for directing or coupling light signals. The faceplate can be one or more microlenses, a waveguide, an image guide, a coherent of bundled fibers, or some combination thereof. A pigtail can be used to split the ordered fibers from the array into two or more jumpers.

As will be realized, the invention is capable of other and different embodiments, and its several details are capable of modifications in various obvious respects, all without departing from the invention. The objects and advantages of the invention may be further realized and attained by means of the instrumentalities and combinations particularly pointed out in the appended claims. Accordingly, the drawing and description are regarded as illustrative in nature, not as restrictive.

We claim:

1. A self-aligning apparatus for electro-optical devices and optical connectors, comprising:
   at least one planar array containing a plurality of optical detectors and at least one planar array containing a plurality of optical emitters with respective drive circuitry coupled to said emitters and said detectors;
   at least one optical link connecting said emitters to said detectors of said respective planar arrays, wherein said at least one optical link establishes an illumination area within said plurality of detectors; and
   a processing section coupled to said detectors and coupled to said emitters, wherein said processing section controls light signals from said emitters to said illumination area and wherein said processing section performs selective measurements of said light signals with said detectors, and wherein said processing section selects a primary emitter/detector pair based on said measurements.

2. The self-aligning apparatus according to claim 1, wherein based on said measurements said plurality of optical detectors comprise one or more spare detectors that are switchably connectable.

3. The self-aligning apparatus according to claim 1, wherein based on said measurements said plurality of optical emitters comprise one or more spare emitters that are switchably connectable.

4. The self-aligning apparatus according to claim 1, wherein based on said measurements one or more spare emitter/detector pairs are substituted for said primary emitter/detector pair.

5. The self-aligning apparatus according to claim 1, wherein said optical links are optical couplers selected from the group comprising: ordered fiber bundle, image guide, waveguide, pigtail and microlenses.

6. The self-aligning apparatus according to claim 1, wherein said optical links are transmissive mediums selected from the group comprising: free space optics and guided wave optics.

7. The self-aligning apparatus according to claim 1, wherein said processing section cycles through said detectors one at a time with one or more emitters active to perform said selective measurements.

8. The self-aligning apparatus according to claim 1, wherein said processing section cycles through said emitters one at a time with one or more detectors active to perform said selective measurements.

9. The self-aligning apparatus according to claim 1, further comprising a memory section, wherein a table of insertion loss values from said selective measurements are stored in said memory section.

10. The self-aligning apparatus according to claim 1, wherein said emitters and said detectors are located on one of said planar arrays.

11. The self-aligning apparatus according to claim 1, wherein said emitters and said detectors are interchangeable by changing a voltage polarity.

12. The self-aligning apparatus according to claim 1, wherein said detector is a device that converts energy of incident radiation into electrical energy.

13. The self-aligning apparatus according to claim 1, wherein said emitter is a device that emits radiation when electrical energy is applied.

14. An optical communications device with built-in redundancy, comprising:
   at least one array containing a plurality of optical detectors and at least one array containing a plurality of optical emitters with respective drive circuitry for said emitters and said detectors, wherein a group of said emitters form an emitter channel and a group of said detectors form a detector channel and said group of said emitters and said group of said detectors operate at a single wavelength;
   at least one emitter multiplexer coupled to said emitter channel;
   at least one detector demultiplexer coupled to said detector channel;
   one or more optical links connecting from said emitter multiplexer to said detector demultiplexer; and
   a processing section coupled to said detectors and coupled to said emitters, wherein said processing section controls light signals from each of said emitters of said emitter channel to each of said detectors of said detector channel and wherein said processing section performs selective measurements to establish a redundancy hierarchy.

15. The optical communications device with built-in redundancy according to claim 14, wherein said plurality of optical detectors comprise redundant detectors that are switchably connectable.

16. The optical communications device with built-in redundancy according to claim 14, wherein said plurality of optical emitters comprise redundant emitters that are switchably connectable.

17. The optical communications device with built-in redundancy according to claim 14, wherein said emitters and said detectors are on one said array.

18. The optical communications device with built-in redundancy according to claim 14, wherein said optical links are selected from the group consisting of: ordered fiber bundle, image guide, waveguide, pigtail, microlenses, and free-space.

19. The optical communications device with built-in redundancy according to claim 14, wherein said processing section cycles through each of said detectors and each of said emitters to form said redundancy hierarchy, wherein said redundancy hierarchy consist of emitter/detector pairs based on insertion loss.

20. The optical communications device with built-in redundancy according to claim 14, wherein said multiplexer and said demultiplexer are selected from the group consisting of: gratings, ordered fiber bundle, image guide, waveguide, pigtail, microlenses, and free-space.

* * * * *

UNITED STATES PATENT AND TRADEMARK OFFICE
CERTIFICATE OF CORRECTION

PATENT NO. : 6,763,157 B1
DATED : July 13, 2005
INVENTOR(S) : Richard J. Williams and Mani Sundaram It is certified that error appears in the above-identified patent and that said Letters Patent is hereby corrected as shown below:

Column 8,
Line 63, delete "fill", insert -- full --.

Column 9,
Line 55, delete "noncritical", insert -- non-critical --.

Column 10,
Line 32, "2" should not be bold.

Column 12,
Line 2, delete "army", insert -- array --.

Signed and Sealed this

Eleventh Day of October , 2005

JON W. DUDAS
*Director of the United States Patent and Trademark Office*